US008658305B2

(12) United States Patent
Morishima

(10) Patent No.: US 8,658,305 B2
(45) Date of Patent: Feb. 25, 2014

(54) LITHIUM-ION BATTERY AND USE THEREOF

(75) Inventor: Ryuta Morishima, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/988,537

(22) PCT Filed: Apr. 10, 2009

(86) PCT No.: PCT/JP2009/057398
§ 371 (c)(1),
(2), (4) Date: Oct. 19, 2010

(87) PCT Pub. No.: WO2010/116533
PCT Pub. Date: Oct. 14, 2010

(65) Prior Publication Data
US 2012/0021264 A1    Jan. 26, 2012

(51) Int. Cl.
*H01M 2/16* (2006.01)
*H01M 4/00* (2006.01)
*H01M 4/13* (2010.01)

(52) U.S. Cl.
USPC .............................. 429/137; 429/94; 429/209

(58) Field of Classification Search
None
See application file for complete search history.

(56) References Cited

U.S. PATENT DOCUMENTS

2010/0221607 A1 * 9/2010 Hatanaka et al. ............. 429/209

FOREIGN PATENT DOCUMENTS

| JP | 11-102730 | | 4/1999 |
| JP | 2003-208891 | | 7/2003 |
| JP | 2005-235695 | | 9/2005 |
| JP | 2006-228544 | | 8/2006 |
| JP | 2006228544 A | * | 8/2006 |
| JP | 2008-103310 | | 5/2008 |
| JP | 2009-38016 | | 2/2009 |
| JP | 2009038016 A | * | 2/2009 |
| WO | WO 2010/067410 A1 | | 6/2010 |

OTHER PUBLICATIONS

International Search Report in International Application No. PCT/JP2009/057398; Mailing Date: Jul. 14, 2009.

* cited by examiner

*Primary Examiner* — Ula C Ruddock
*Assistant Examiner* — Daniel Gatewood
(74) *Attorney, Agent, or Firm* — Finnegan, Henderson, Farabow, Garrett & Dunner, LLP

(57) ABSTRACT

The lithium-ion battery provided by the present invention has an electrode assembly (30) obtained by superposing and winding together a long continuous positive electrode sheet (32) and negative electrode sheet (34) with a separator (35) interposed therebetween. An active material layer (344) is formed on the negative electrode sheet (34), with a band-shaped margin being left on one edge thereof along the lengthwise direction of the collector (342). The above band-shaped portion (342a) sticks out beyond the edge of the positive electrode sheet (32). On the exterior surface of the negative active material layer (344), a porous inorganic layer (346) is formed starting at the flat part (344a) of the active material layer, wrapping around the edge (344b) thereof, and extending to the surface of the collector (342). The porosity Pa at the edge (344b) of the inorganic layer (346) is less than the porosity Pb at the flat part (344a) thereof.

9 Claims, 7 Drawing Sheets

LITHIUM-ION BATTERY AND USE THEREOF

CROSS-REFERENCE TO RELATED APPLICATIONS

This application is a national phase application of International Application No. PCT/JP2009/057398, filed Apr. 10, 2009, the contents of which are incorporated herein by reference.

TECHNICAL FIELD

The present invention relates to a lithium-ion battery, a method for producing the same, and a battery pack using the same.

BACKGROUND ART

The demand for lightweight, powerful lithium-ion batteries as a power supply for vehicles as well as for personal computers and portable terminals (PDAs) is expected to increase greatly in the future. A typical structure of a lithium-ion battery features positive and negative electrodes comprising an active material capable of storing and releasing lithium-ions, a separator positioned between the electrodes, and a nonaqueous electrolyte. For example, a lithium-ion battery is known having a configuration in which an electrode assembly obtained by superposing positive and negative electrode sheets, each having a layer of active material as the main component thereof (active material layer) on the surface of a long continuous sheet collector, and winding the same in the lengthwise direction with a separator interposed therebetween (wound electrode assembly) is housed in a container together with a nonaqueous electrolyte.

Providing a porous layer having an inorganic material as the main component thereof on the electrode surface in a lithium-ion battery of such a configuration can be an effective technique for increasing the reliability (capability of preventing internal shorts, etc.) of that battery. In relation to this type of lithium-ion battery, patent document 1 discloses that the duration of charge retention under high temperature conductions can be extended by providing a porous film of a specified thickness and porosity on the surface of the negative electrode. Patent documents 2 to 4 can be noted as other technical documents relating to lithium-ion batteries.

Patent document 1: Japanese Patent Application Laid-open No. 2006-228544
Patent document 2: Japanese Patent Application Laid-open No. 2008-103310
Patent document 3: Japanese Patent Application Laid-open No. 2003-208891
Patent document 4: Japanese Patent Application Laid-open No. H11-102730

DISCLOSURE OF THE INVENTION

Among the wound electrode assemblies as discussed above is one having a mode using an electrode sheet whereon the above active material layer is provided while leaving a band-shaped margin on at least one edge along the lengthwise direction of the collector, and both electrode sheets are superposed and wound so that the band-shaped portion sticks out beyond the sheet of the counter electrode (patent document 2). An object of the present invention is to provide a lithium-ion battery comprising this type of electrode assembly and having even higher performance, and a method for producing the same. A further object of the present invention is to provide a battery pack using that lithium-ion battery.

Upon conducting various investigations into the behavior of lithium-ion batteries having an electrode assembly of the above mode, the inventors discovered that with this battery internal micro-shorts will sometimes occur due to the configuration that differs from the electrode assemblies of other modes (e.g., a wound electrode assembly comprising electrode sheets that not have a band-shaped portion along the lengthwise direction whereon the active material layer has not been formed) because of unique factors related to the mode of the above electrode assembly. In addition, the inventors discovered a configuration that can effectively prevent the occurrence of the above internal shorts while suppressing adverse effects on other battery properties (e.g., output performance) and a method for producing a battery having that configuration, thus completing the present invention.

The present invention provides a lithium-ion battery having a wound electrode assembly. The wound electrode assembly is obtained by superposing and winding together a negative electrode sheet having a negative active material layer on the surface of a long continuous sheet negative collector, a positive electrode sheet having a positive active material on the surface of a long continuous sheet positive collector, and a long continuous sheet separator interposed therebetween. The above negative active material layer is formed, with a band-shaped margin being left on at least one edge of the negative electrode collector along the lengthwise direction thereof. In addition, the above negative electrode sheet is superposed on the above positive electrode sheet so that the above band-shaped portion sticks out beyond one edge of the positive electrode sheet along the lengthwise direction thereof. Additionally, on the exterior surface of the above negative active material layer a porous inorganic layer is formed starting at the flat part of the active material layer, wrapping around the edge thereof on the side of the above band-shaped portion, and extending to the surface of the above negative collector. In addition, the porosity Pa [vol %] of the above porous inorganic layer at the edge of the above negative active material layer on the side of the band-shaped portion is lower than the porosity Pb [vol %] of the inorganic layer at the width center of the active material layer.

As shown schematically in FIG. 3, in a battery having an electrode assembly that is wound so that a band-shaped portion of the negative electrode sheet (i.e., a band-shaped portion on which the negative active material layer has not been formed) sticks out beyond one edge of the positive electrode sheet along the lengthwise direction as disclosed above, the edge 32c of the positive electrode sheet 32 is positioned closer to the interior than the edge of the electrode assembly 30 in the winding axis direction (left edge of FIG. 3). Therefore, a gap is formed on the exterior side of the edge 32c, e.g., the location illustrated by the symbol S in FIG. 3. This gap S is a location wherein contaminants are likely to accumulate whenever contaminants are present inside the battery. For example, the contaminants become trapped in the above gap S by movement of the electrolyte accompanying cycling, movement of the electrolyte accompanying positional changes in the battery and vibrations, etc.

In a conventional configuration wherein the surface of the negative active material layer 344 (in particular, the edge 344b on the side whereon the negative active material layer has not been formed) is exposed to the outside, whenever metallic contaminants accumulate in the gap S, a micro-short site can be formed between the positive electrode sheet 32 and the negative electrode sheet 34 because of the metallic components in the contaminants. For example, whenever a metal contained in the above contaminants becomes electrochemically dissolved along with cycling of the battery and precipitates on or near the surface of the negative electrode sheet 34, the precipitate can become embedded in the fine pores of the separator 35 and form a conductive pathway between the electrode sheets 32, 34. The formation of these micro-shorts damages the separator (typically, made of thermoplastic resin) by generating Joule heat locally at the site of the short, and that can then become a factor contributing to a major internal short (self-discharge). The above micro-shorts can bring about a decrease in voltage over time, and when the battery is used as a power source for a hybrid automobile, for example, they can cause a decrease in fuel efficiency.

As a countermeasure to the above problem of micro-shorts, in the lithium-ion battery of the present invention the exterior surface of the negative active material is covered by a porous inorganic layer starting on the flat part, wrapping around the end thereof, and extending to the surface of the collector. Thus, micro-shorts caused by the above contaminants can be prevented to a great extent because of a configuration wherein not only the flat part of the negative active material layer, but also the end thereof (the part adjacent to the place where the above contaminants are likely to accumulate) is completely covered by the above inorganic layer (i.e., an insulating protective layer). Therefore, the lithium-ion battery of the present invention can provide excellent protection against internal micro-shorts (and can even provide excellent capacity retention).

To make the drawing in FIG. 3 easier to see, there are gaps between both electrode sheets 32, 34 and the separator 35, but in an actual typical battery both electrodes 32, 34 and the separator 35 are tightly wound for better reaction efficiency, specific capacity, etc. Therefore, material movement at the edges of the active materials 324, 344 plays a major role in the penetration of the electrolyte into the active material layers 324, 344, and the influx and efflux of lithium (Li) ions.

Whenever a configuration is used wherein the edge 344b of the negative active material 344 is completely covered by the inorganic layer 346, the lithium ion influx and efflux (i.e., the lithium ion mobility through the inorganic layer 346) at the edge 344b tends to be lower than in a configuration wherein the edge 344b is not covered by the inorganic layer 346. Such a decrease in the mobility of the lithium ions can be a contributory factor to an increase in internal resistance of the battery and a decrease in battery performance (particularly output performance). Especially in uses requiring high output such as in a power source for an automobile, it is desirable for the prevention of micro-shorts to be increased while minimizing any decrease in output performance. In general, as the porosity of the porous inorganic layer increases, the material mobility through that inorganic layer tends to increase, but conversely, decreasing the porosity of the above inorganic layer is advantageous from the standpoint of preventing micro-shorts. Therefore, it has been essentially impossible to achieve both the above short prevention and material mobility (lithium ion mobility, electrolyte penetration, etc.) at a high level merely by increasing or decreasing the porosity of the porous inorganic layer.

According to the technology disclosed herein, it is possible to prevent or suppress damage (e.g., an increase in internal resistance) that can occur when the above edge is completely covered by the above inorganic layer by making the porosity Pa of the above inorganic layer at the edge of the above negative active material layer on the side with the band-shaped portion lower than the porosity Pb of that inorganic layer at the width center of that active material layer (i.e., Pa/Pb<1, e.g., 0.25≤Pa/Pb≤0.95). Consequently, a high performance battery with a balance of high levels of micro-short prevention and other battery performance (e.g., output performance) can be realized thereby.

Preferably, the porosity Pa of the above inorganic layer at the edge of the above negative active material layer on the side with the band-shaped portion lies in the range of about 20 to 65 vol %, for example. Thus, it is possible to assure material mobility through the inorganic layer covering the above edge while preventing the micro-shorts caused by the above contaminants to a great extent.

In one preferred embodiment of the battery disclosed herein, basis weight (mass per unit area; METSUKE) Wa [mg/cm$^2$] of the above inorganic layer at the edge of the above negative active material layer on the side with the band-shaped portion is less than basis weight Wb [mg/cm$^2$] of the above inorganic layer at the width center of that active material layer (i.e., Wa/Wb<1, e.g., 0.5≤Wa/Wb<1). Thus, it is possible to increase material mobility through the above inorganic layer at the edge by making basis weight of the inorganic layer covering the edge less than that in the width center thereof (typically, by making the inorganic layer thinner). Consequently, it is possible to prevent or suppress damage that can occur when the above edge is completely covered by the above inorganic layer.

In one preferred embodiment of the lithium-ion battery disclosed herein, the above negative electrode sheet is superposed on the above positive electrode sheet so that the edge of the above negative active material layer on the side of the above band-shaped portion (the side whereon the negative active material layer has not been formed) sticks out beyond the positive active material layer. Such a configuration wherein the negative active material layer is positioned over a wider area than the positive active material layer on the side of the band-shaped portion is advantageous for preventing a phenomenon wherein lithium ions that have moved to the negative electrode side from the positive active material layer precipitate on the surface of the negative electrode collector (i.e., a location whereat the negative electrode collector is exposed). On the other hand, in this configuration, in addition to the band-shaped portion, a portion of the negative active material layer is positioned to stick out beyond the positive active material layer, so the width of the negative electrode sheet that is sticking out tends to be relatively larger, and as a result the above contaminants can more easily accumulate on the interior side of the part that sticks out. Even in this configuration, the lithium-ion battery disclosed herein provides an inorganic layer on the surface of the negative active material layer that, as noted above, starts on the flat part, wraps around the end thereof, and extends to the surface of the above collector, can properly prevent the occurrence of the micro-shorts. A particularly favorable result can be realized by setting the Pa of the inorganic layer formed on the edge of the negative active material within the above range.

The present invention provides a method for producing a lithium-ion battery having an electrode assembly obtained by winding positive and negative electrode sheets, each having a layer of active material formed on the surface of a long continuous sheet collector, together with a long continuous sheet separator. This method includes a step of forming a negative active material layer on the surface of the negative electrode collector, with a band-shaped margin being left on at least one edge of that collector along the lengthwise direction thereof. The method also includes a step of applying a slurry containing inorganic particles and binder to the negative electrode collector on which the above negative active material has been formed, and forming thereby a porous inorganic layer starting at the flat part of the above negative active material layer, passing over the end thereof on the side of the above band-shaped portion, and extending to the surface of the above negative electrode collector. The porous inorganic layer is formed such that the porosity Pa [vol %] of the porous inorganic layer at the edge of the above negative active material layer on the side of the band-shaped portion is lower than the porosity Pb [vol %] of the inorganic layer at the width center of the above active material layer. The above production method also includes a step of constructing an electrode assembly by superposing a negative electrode sheet, which has been prepared by forming a negative active material layer and a porous inorganic layer on the surface of a negative electrode collector, and a positive electrode sheet so that the band-shaped portion of the negative electrode sheet sticks out beyond one edge of the positive electrode sheet along the lengthwise direction, with a separator interposed therebetween, and winding them together (i.e., the superimposed positive electrode sheet, negative electrode sheet, and separator). Additionally, it includes a step of housing the above electrode assembly in a container together with a nonaqueous electrolyte to configure a lithium-ion battery.

According to this method, even when metallic contaminants accumulate on the exterior side of one edge of the positive electrode sheet as described above, it is possible to produce a lithium-ion battery wherein the micro-shorts caused by those contaminants are prevented (and even wherein the self-discharge prevention properties are excellent). In addition, it is possible to produce an even higher performance lithium-ion battery by forming the above inorganic layer so that Pa/Pb is less than 1 (e.g., about $0.25 \leq Pa/Pb \leq 0.95$).

In one preferred embodiment, the above inorganic layer is formed so that Pa/Pb is less than 1 and Wa/Wb is also less than 1. As a result, a lithium-ion batter with even higher performance can be produced.

In one preferred embodiment of the technology disclosed herein, at least two types of slurry, which are a first type and a second type, are used as the slurry for forming the above inorganic layer. In addition, in the porous inorganic layer, the part covering the end of the active material (first part) and the part covering the part in the width center (second part) are formed from different slurries. For example, the above first slurry is applied to the edge of the above negative active material layer on the side of the band-shaped portion, and the above second slurry is applied to the width center of that active material layer. According to this embodiment, the porosity Pa and Pb of the above first part and second part can each be adjusted easily. Therefore, a porous inorganic layer satisfying the condition of Pa/Pa<1 can be stably formed. Applying different slurries to the edge and width center of the active material layer as noted above is also convenient in terms of making basis weight Wa and Wb of the first part and the second part different (typically, making Wa/Wb<1).

The present invention also provides a battery pack comprising a plurality of single cells aligned in a predetermined direction. Each of the above single cells has a structure wherein an electrode assembly prepared by superposing and winding together positive and negative electrode sheets interposed with a separator is housed in a container. The above plurality of single cells is aligned in the transverse direction in relation to the axis of the above electrode assembly, and is restrained in a state such that a load is applied in the direction of alignment. At least one (and possibly all) of the plurality of single cells is any one of the lithium-ion batteries disclosed herein (which can be a lithium-ion battery produced by any one of the methods disclosed herein). In a battery pack of this structure the wound electrode assembly is tightened in a direction transverse to the axis (i.e., both electrode sheets and the separator constituting the electrode assembly are compressed in the build-up direction), so the movement of material at the end of the active material layer becomes particularly important. Consequently, the effectiveness of using the configuration of any one of the lithium-ion batteries disclosed herein can be displayed particularly well.

Because the lithium-ion battery disclosed herein has the excellent self-discharge prevention property noted above and can also provide excellent battery performance, it is quite suited as a lithium-ion battery to be mounted in a vehicle. For example, in the mode of a battery pack wherein a plurality of the above lithium-ion batteries are connected in series, the battery pack can be most suitably used as a power source for a motor (electric motor) of a vehicle such as an automobile. Therefore, the present invention provides a vehicle equipped with any one of the lithium-ion batteries disclosed herein (which can be a lithium-ion battery produced by any one of the methods disclosed herein). This can be a vehicle equipped with any one of the battery packs disclosed herein.

BEST MODE FOR CARRYING OUT THE INVENTION

Figure 1:
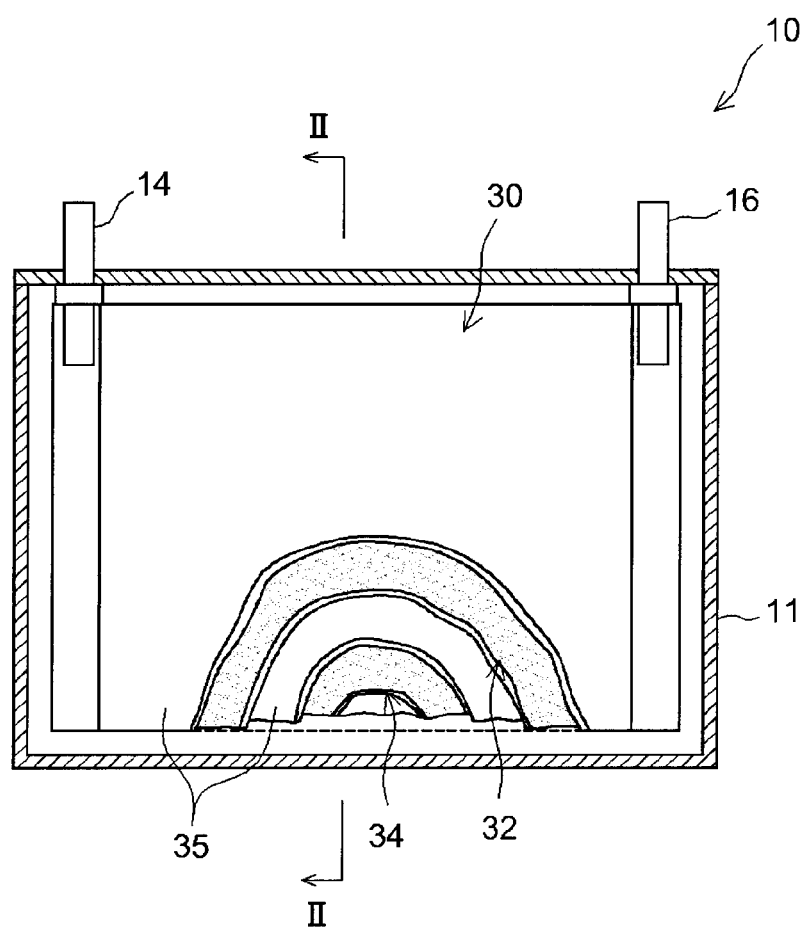
FIG. 1 is a schematic, cross-sectional drawing showing the structure of one embodiment of the lithium-ion battery.

Preferred embodiments of the present invention are described below. Matters other than those specifically discussed herein that are necessary to carry out the present invention can be considered matters of design for a person skilled in the art based on prior art in the field. The present invention can be carried out based on the content disclosed herein and common technical knowledge in this field. In the drawings below, components and locations providing the same action are described using the same symbols, and duplicate explanations are sometimes omitted or abbreviated.

The invention disclosed herein can be widely applied to a lithium-ion battery providing an electrode assembly obtained by superposing and winding a negative electrode sheet having a negative active material layer on the surface of a long continuous sheet negative collector and a positive electrode sheet having a positive active material on the surface of a long continuous sheet positive collector with a long continuous sheet separator interposed therebetween, and of a structure having a porous inorganic layer on the external surface of the above negative active material layer; to a negative electrode for that lithium-ion battery; to a battery pack comprising that lithium-ion battery (e.g., a battery pack wherein a plurality of single cells including at least one of the above lithium-ion batteries is connected in series); and to methods for producing the same. The external shape of the lithium-ion battery is not particularly limited herein, and can be a shape such as a rectangular solid, flattened square, cylinder, and the like.

A sheet-shaped material comprising a metal with good conductivity can be used as the negative electrode collector. In particular, the use of a negative electrode made from copper (Cu) or an alloy having copper as the main component thereof (copper alloy) is preferred. The size of the negative electrode collector is not particularly limited herein, and it can be suitably selected in accordance with the intended shape, etc., of the lithium-ion battery. For example, a metal foil approximately 5 µM to 30 µm thick can be preferably used as the negative electrode collector. The width of the negative electrode collector can be made about 2 cm to 15 cm, for example, and the length can be made about 5 cm to 1000 cm.

The negative electrode sheet in the technology disclosed herein has a layer with a negative active material as the main component thereof (negative active material layer) on the surface of the negative electrode collector. The negative active material layer is formed while leaving a band-shaped margin on at least one edge of the negative electrode collector along the lengthwise direction thereof, and typically is formed on the surfaces of two sides (both-sided) of the negative electrode collector. The above band-shaped portion (part whereon the negative active material layer has not been formed on the negative electrode collector, also referred to as "part whereon the negative active material layer has not been formed") can be used, as noted below, as a site for electrically connecting the above negative electrode sheet to a negative terminal for connection to the outside (current collector).

The above part whereon the negative active material layer has not been formed is preferably provided at a location that overlaps both sides of the negative electrode collector (preferably, a location that is roughly the same on both sides). From the standpoint of the energy density, etc., of a lithium-ion battery, preferably a negative electrode sheet can be used in a mode wherein the part whereon the negative active material is not formed is provided at roughly the same location on both sides at one edge along the lengthwise direction of the negative electrode collector, and the negative active material layer is formed essentially to the edge on both sides of the other edge along the lengthwise direction of that collector (i.e., a mode wherein the part whereon the negative active material layer has not been formed is provided on only one edge along the lengthwise direction).

Preferably, the above part whereon the negative active material layer has not been formed is formed extending continuously over a length of at least two windings of the wound electrode assembly comprising this negative electrode sheet. In one preferred embodiment, the part whereon the negative active material layer has not been formed extends to the entire length of the negative electrode sheet. The width of the part wherein a negative active material layer has not been formed can be suitably established in accordance with the shape of the electrode assembly and the connection structure, of the collector, etc. Normally, a width of roughly 5 mm to 50 mm (e.g., 10 mm to 30 mm) is suitable.

A material capable of reversibly storing and releasing lithium ions can be used as the negative active material, and a suitable material from among the various negative active materials known to be capable of functioning as the negative active material of a lithium-ion battery can generally be used. A carbon material is exemplified as a suitable negative active material in the technology disclosed herein. The use of a particulate carbon material (carbon particles) comprising at least partially a graphite structure (layered structure) is preferred. So-called graphite material, hard carbon, soft carbon, or any carbon material comprising a combination thereof can be used. For example, natural graphite, mesocarbon microbeads (MCMB), highly oriented pyrolytic graphite (HOPG), etc., can be used.

A particulate with an average particle size of about 5 µm to 50 µm, for example, is preferred as a property of the above negative active material. Within the above range, the use of carbon particles with an average particle size of about 5 µm to 15 µm (e.g., about 8 µm to 12 µm) is preferred. Carbon particles with such a relatively small particle size have a large surface area per unit volume, and therefore can serve as a negative active material suited for even more rapid cycling (e.g., high output discharge). Therefore, a lithium-ion battery having such a negative active material can be most suitably used, for example, as a lithium-ion battery for mounting in a vehicle. In addition, in comparison with a case wherein large particles are used, there is little change in volume of the individual carbon particles accompanying cycling with the above kind of carbon particles of relatively small particle size, and therefore the change in volume of the negative active material layer as a whole can be buffered (absorbed) better. This is advantageous from the standpoint of durability (prevention of peeling, etc.) of the porous inorganic layer formed on the negative active material layer.

Preferably, the above negative active material layer can be fabricated by applying to the negative electrode collector a liquid composition (typically a paste or slurry composition) comprising a negative active material (preferably a particulate, e.g., carbon particles) dispersed in a suitable medium, and drying that composition (composition for forming the negative active material layer). Any one of water, an organic solvent, or a mixed medium thereof can be used as the above medium (dispersing medium for the negative active material). For example, an aqueous medium (water or a mixed medium having water as the main component) can be preferably used as the medium for the composition for forming the negative active material layer.

In addition to the negative active material and the above medium, the above composition for forming the negative active material layer can contain one or more types of materials that are generally used for forming a negative active material layer in the manufacture of a negative electrode for a lithium-ion battery, which are admixed into the liquid composition as needed. Examples of such a material include a polymer that can function as a binder (adhesive) and/or fluidity adjustor. For example, one or more types of materials suitably selected from polymers such as polyvinylidene fluoride (PVDF), polytetrafluoroethylene (PTFE), polyvinylidene fluoride-hexafluoropropylene copolymer (PVDF-HFP), styrene butadiene rubber (SBR), carboxymethylcellulose (CMC), etc., can be suitably used as the above binder and/or fluidity adjustor (typically, a viscosity adjustor, e.g., a thickener).

Although not particularly limited herein, the solids content (weight ratio of the non-volatile component, i.e., the amount of negative active material layer-forming component in the total composition; hereinafter, abbreviated NV) of the composition for forming the negative active layer is suitably set about 40% to 60%, for example. In addition, the weight ratio of negative active material in the solids content (negative active material layer-forming component) can be set at about 85% or more (typically about 85% to 99.9%) for example, preferably about 90% to 99%, and more preferably about 95% to 99%.

In applying the composition for forming the negative active material layer to the negative electrode collector, the same techniques as in prior art, publicly known methods can be suitably used. For example, a predetermined amount of the above composition for forming the negative active material layer can be applied to the surface of the collector using a suitable applicator (gravure coater, slit coater, die coater, comma coater, etc.) At that time it is possible to form the negative active material layer in a predetermined are by applying the above composition while leaving uncoated the site corresponding to the above part whereon the negative active material layer will not be formed. Alternatively, the part wherein the negative active material layer will not be formed can be prepared by removing from the collector a predetermined area of the negative active material layer that has already been formed. The combined use of the methods mentioned above may also be executed.

The amount of composition for forming the negative active material layer to be applied (amount to be applied per unit area of the collector) is not particularly limited herein, and can suitably differ depending on the shape of the negative electrode sheet and battery, and on the target performance, etc. In one preferred embodiment, the above composition can be applied to both sides of the foil collector (e.g., a metal foil (copper foil, etc) about 5 μm to 30 μm thick can preferably be used) so that the amount of application (i.e., the weight after drying) converted to NV is about 5 to 20 mg/cm$^2$ on both sides combined.

After application the negative active material layer can be formed on the surface of the negative electrode collector by drying the applied material using a suitable drying means and applying compression as needed. Although not particularly limited herein, the density of the above negative active material layer can be about 1.1 to 1.5 g/cm$^3$. The density of that negative active material layer can also be about 1.1 to 1.3 g/cm$^3$. The above compression conditions can be set so that a negative active material layer having such a density will be formed. As far as the compression method is concerned, various types of publicly known pressing methods such as roll pressing, flat plate pressing, and the like.

In the negative electrode sheet of the technology disclosed herein a porous inorganic layer is provided on the exterior surface of the above negative active material layer starting at the flat part, wrapping around the edge on the side of the above part whereon the active material layer has not been formed, and extending to the surface of the negative electrode collector. In this case, the term "flat part" of the negative active material layer refers to the part wherein the active material layer is spread flat, and preferably at a roughly uniform thickness. Typically, the part wherein the negative active material layer and the positive active material are superposed and aligned is contained in the flat part of the above negative active material layer. In one preferred embodiment, the porous inorganic layer is provided extending continuously over the entire area of the above flat part.

On the other hand, the term "edge on the side of the part whereon the active material layer has not been formed" of the negative active material layer refers to the edge along the boundary with the part of the negative active material layer whereon the active material layer has not been formed, and typically this is a part continuous with the flat part of the negative active material layer. This edge on the side of the part whereon the active material layer has not been formed can be an area 2 mm wide, for example, toward the interior of the negative active material layer from the boundary between the negative active material layer and the part whereon the active material is not formed. Preferably, this edge on the side of the part whereon the active material layer has not been formed is aligned so at least one part thereof sticks out beyond the positive active material layer.

Figure 3:
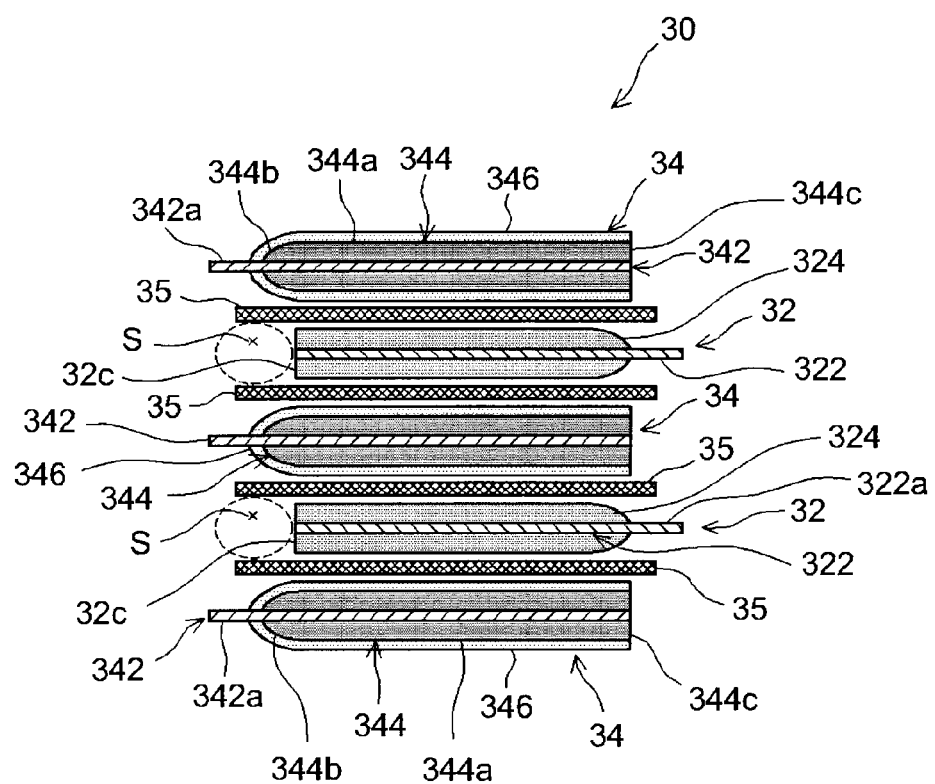
FIG. 3 is a schematic, cross-sectional drawing illustrating the positive and negative electrode sheets and the separator constituting one embodiment of the lithium-ion battery.
Figure 4:
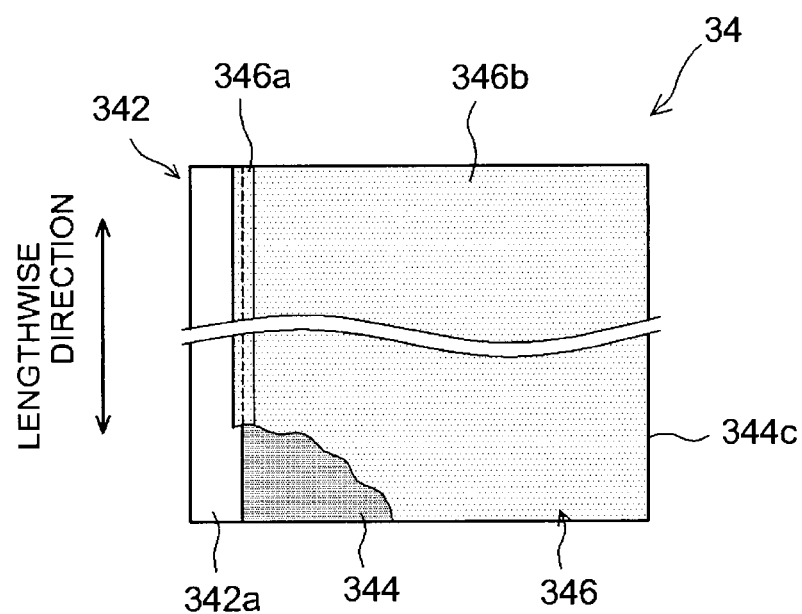
FIG. 4 is a schematic, horizontal projection illustrating a negative electrode sheet constituting one embodiment of the lithium-ion battery.
Figure 5:
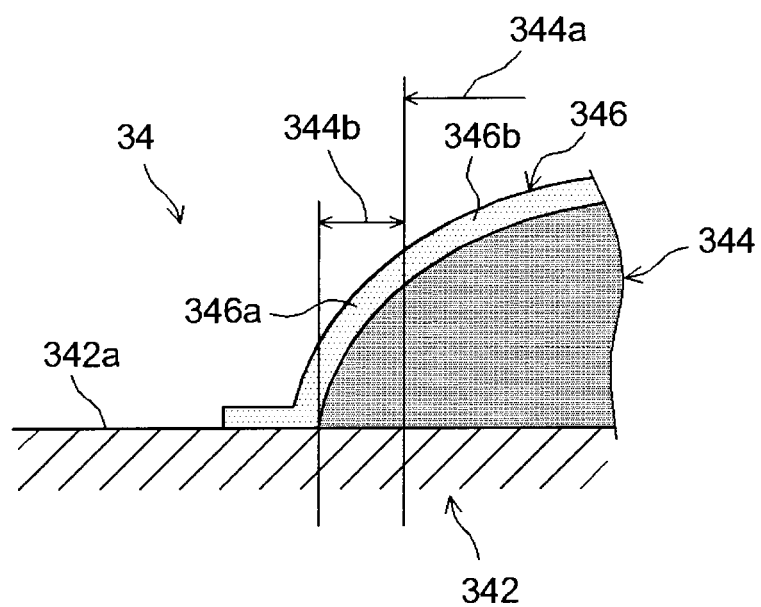
FIG. 5 is a schematic drawing illustrating an enlargement of part of FIG. 3.

As shown in FIG. 3 to FIG. 5, in the typical structural example of the negative electrode sheet 34 disclosed herein, a porous inorganic layer 346 extends from the flat part 344a of the negative active material layer 344 to the edge 344b on the side of the part whereon the negative active material layer has not been formed, and then wraps around that edge 344b following the thickness of the negative active material layer 344 and continues until it reaches the surface of the negative electrode collector 342. In other words, the edge 344b of the negative active material layer 344 is completely covered by the insulating porous inorganic material layer 346. To a large extent this configuration can prevent the phenomenon wherein micro-shorts occur between the edge 344b on the side of the part whereon the negative active material layer has not been formed of the negative active material layer 344 and the counter electrode (positive electrode sheet). FIG. 3 is a schematic, cross-sectional drawing illustrating an enlargement of the part of the cross section wherein the wound electrode assembly 30 is sectioned in the radial direction (direction of stacking of the negative electrode and positive electrode sheets and the separator).

In the technology disclosed herein the average pore size of the fine pores (voids) contained in the porous inorganic layer is not limited and can be established so that the purposes for forming the inorganic layer (increased battery reliability, more specifically, prevention of micro-shorts, etc.) are suitably attained, and the desired battery performance is assured. For example, the preferred porous layer is one wherein the average pore size lies within the range of about 0.01 μm to 10 μm (and more preferably about 0.1 μm to 4 μm). The average pore size can be measured using a commercially available mercury porosimeter.

In a typical embodiment of the negative electrode sheet disclosed herein, within the porous inorganic layer, the porosity Pa [vol %] of the part covering the edge of the negative active material layer on the side whereon the active material layer has not been formed (first part) is less than the porosity Pb [vol %] of the part covering the width center of that active material layer (second part). As a result, both protection against shorts and material mobility can be established at a high level. In other words, as noted above, because the edge on the side of the part of the negative active material layer whereon the above active material layer has not been formed is adjacent to a site where contaminants are likely to accumulate, short prevention properties at that edge can be increased by making the porosity of the above first part Pa, which covers that edge part, relatively low. On the other hand, micro-shorts caused by the above contaminants are less likely to occur at the flat part of the negative active material (the center width part of the negative active material layer is included in the flat part) than at the above edge part. By utilizing this fact and making the porosity Pb of the above second part relatively high, it is possible to increase material mobility (electrolyte penetration, lithium ion mobility, etc.) between the negative active material layer and the outside. According to such a configuration, both short prevention and battery performance can be established at a high level in the negative electrode sheet as a whole.

The ratio Pa/Pb of the above porosities typically ranges from 0.25 or more to less than 1, and preferably about 0.3 or more to 0.9 or less. If Pa/Pb is too low, there is not enough material mobility through the above first part, and internal resistance of the battery can tend to increase as a result.

As another effect that can be realized by the configuration disclosed herein, when the electrolyte permeates into the electrode assembly during the battery manufacturing method, variations in the time required for permeation of the electrolyte can be reduced more than when the porosity of the porous inorganic layer is uniform throughout the entire inorganic layer. This result is preferred from the standpoint of increased battery productivity, increased quality stability, etc.

Although not particularly limited herein, the above porosity Pa can be set to about 70 vol % or less (typically 10 to 70 vol %), for example. In one preferred embodiment, Pa lies within the range of about 20 to 65 vol % (for example, about 35 to 65 vol %). As a result, it is not only possible to prevent micro-shorts caused by the above contaminants to a large extent, but also material mobility (lithium ion mobility, electrolyte penetration, etc.) of the first part of the above inorganic layer can be increased in a range wherein micro-short prevention is not noticeably lost. Therefore, both short prevention and battery performance can be established at an even higher level in the negative electrode sheet as a whole.

If the porosity Pa of the above first part is too low, when the electrolyte permeates into the electrode assembly during the battery manufacturing method, the time required for permeation of the electrolyte is increased because the material mobility from the above first part into the negative active material layer through the above first part is reduced, and as a result battery productivity tends to decrease. When initial charging is carried out in a state wherein penetration of the electrolyte is insufficient (e.g., a state wherein sites remain wherein the electrolyte has not penetrated into some of the negative active material layer), differences between the sites where the electrolyte has penetrated and the sites where it has not can occur in the surface state of the negative active material (e.g., whether or not SEI (Solid Electrolyte Interference) is produced, the amount thereof produced (film thickness), composition and properties thereof, etc.), and variation in battery performance can be caused thereby. On the other hand, if Pa is too high, short prevention at the edge of the negative active material later (e.g., this can be detected as a decrease in film resistance discussed below) will tend to decrease.

Furthermore, the porosity Pb of the second part of the porous inorganic layer can be suitably established in a range so that it is higher than the porosity Pa of the first part (i.e., a range wherein Pa/Pb<1). For example, Pb can be set to about 25 to 90 vol %, and normally setting Pb to about 30 to 80 vol % (e.g., about 40 to 70 vol %) is preferred.

The porosity of the porous inorganic layer can be calculated by dividing basis weight (weight per unit area) by the thickness of that inorganic layer. In this case, basis weight of the porous inorganic layer can be determined by a method such as x-ray fluorescence analysis, or measuring the amount of increase in weight associated with the formation of the organic layer, etc., as discussed below. In addition, the thickness of the porous inorganic layer can be determined using a commercially available film thickness measuring device (which can be a device using one of various methods such as the rotary caliper method, stylus method, and the like). Alternatively, the thickness of the porous inorganic layer can be determined by electron microscopy of a cross-section of the negative electrode sheet.

Normally, "the porosity Pb of the inorganic layer at the center of the width of the negative active material layer" can be expressed as the porosity at the exact center of the width of the negative active material layer (i.e., the value of the porosity measured at this part is used as Pb). Additionally, "the porosity Pa of the inorganic layer formed at the edge on the side whereon an active material layer has not been formed" can be expressed as the porosity roughly in the center of an area 2 mm wide toward the interior from the boundary between the negative active material layer and the part whereon an active material layer has not been formed (e.g., the part 1 mm toward the interior from the above boundary).

The negative electrode sheet disclosed herein preferably can be carried out in a mode wherein the weight ratio (Wa/Wb) of basis weight Wa of the inorganic layer formed at the above edge of the negative active material layer on the side of the part whereon the active material layer has not been formed (first part) to basis weight Wb of the inorganic layer at the width center of that active material layer (second part) is, for example, about 0.5 to 1.2. basis weight of the inorganic layer at each part (e.g., an inorganic layer having alumina particles as the main component thereof) can be determined, for example, by general x-ray fluorescence analysis. For example, basis weight of the porous inorganic layer can be determined by carrying out a preliminary test to investigate the relationship between basis weight and intensity of x-ray fluorescence corresponding to the material of the inorganic particles to be used and applying that result. Alternatively, basis weight of the inorganic layer can be determined from the change in weight measured before and after formation of the porous inorganic layer.

The inorganic layer covering the negative active material layer becomes resistant to the influx and efflux of lithium ions to and from the active material layer. Therefore, if Wa/Wb is too small, the resistance of the above edge decreases locally, and current crowding at the edge (reaction nonuniformity during cycling) is likely to occur. This current crowding (i.e., imbalance of current density) can be a contributing factor in accelerating degradation of the battery. In particular, in a mode of use accompanying high rate charging such as in a lithium-ion battery used as a motor power source for a vehicle, the above current crowding imbalance tends to become very large, and therefore side reactions such as decomposition of the electrolyte, etc., are likely to be accelerated. When charging is repeated with such greatly imbalanced charge crowding, the loss of battery capacity is likely to progress. On the other hand, if Wa/Wb is too high, resistance to the influx and efflux of lithium ions to and from the above edge increases locally. As a result, the lithium ion receptivity of the above edge decreases, and lithium tends to precipitate on that edge. Particularly in a mode of use accompanying high rate charging, lithium precipitation is likely to occur. This precipitation of lithium can be a factor causing a decrease in battery capacity. By setting Wa/Wb at the above range, it is possible to retain battery durability (e.g., little loss of capacity even with repeated cycling) at a high level while completely covering the edge of the negative active material with the porous inorganic layer and preventing micro-shorts to a large extent thereby.

In one preferred embodiment, the weight ratio Wa/Wb of the first part to the second part of the porous inorganic layer lies in a range roughly less than 1 (i.e., Wa/Wb<1; typically 0.5≤Wa/Wb<1). In the technology disclosed herein, because the first part of the porous inorganic layer has a lower porosity than the second part, if Wa/Wb is less than 1, normally the thickness of the first part will be less than the thickness of the second part. Thus, when the thickness of the porous inorganic layer at the edge (first part) is relatively less than the thickness at the width center of the negative active material layer (typically, the flat part including the width center), a wound electrode assembly can be easily obtained wherein the negative and positive electrode sheets and the separator are wound more densely. This is advantageous for increasing the energy density of the battery. In addition, making the thickness of the first part of the porous inorganic layer less than that of the second part is advantageous for increasing material mobility from the above edge at the side of the part whereon an active material layer has not been formed toward the interior of the electrode assembly in the axial direction (typically, toward the width center) compared, for example, with a case wherein the thickness of the inorganic layer is uniform across the entire range.

With the technology disclosed herein, because the porosity of the first part of the porous inorganic layer is made relatively smaller, the thickness of that first part can be made even smaller while retaining the desired level of micro-short prevention in the first part (which can be determined by film resistance as discussed below). According to one preferred embodiment of the technology disclosed herein, it is possible to prevent or suppress damage that can occur when the above edge is completely covered by the above inorganic layer to an even greater extent through the synergistic effect resulting from the fact that the porous inorganic layer satisfies the equation Pa/Pb<1 (preferably, $0.25 \leq Pa/Pb \leq 0.95$; e.g., $0.3 \leq Pa/Pb \leq 0.9$) and also the equation Wa/Wb<1 (preferably, $0.5 \leq Wa/Wb < 1$). Consequently, a high performance battery with a balance of even higher levels of micro-short prevention and other battery performance can be realized thereby.

The preferred range for Wb can differ depending on the composition of the porous inorganic layer and the configuration of the battery, but normally setting the range at about 0.3 to 3 mg/cm$^2$ (e.g., 0.5 to 1 mg/cm$^2$) is suitable. If Wb is too small, a sufficient micro-short prevention effect may be hard to obtain. If Wb is too large, the internal resistance of the battery will tend to increase.

Normally, "basis weight Wb of the inorganic layer at the width center of the negative active material layer" can be expressed by basis weight at the exact center of the width of the negative active material layer (i.e., that basis weight value is used as Wb). Additionally, "basis weight Wa of the inorganic layer formed at the edge on the side of the part whereon an active material layer has not been formed" can be expressed as basis weight roughly in the center of an area 2 mm wide toward the interior from the boundary between the negative active material layer and the part whereon the active material layer has not been formed (e.g., the part 1 mm toward the interior from the above boundary).

In one preferred embodiment, the porous inorganic layer extends even to the outside of the boundary between the negative active material layer and the part whereon an active material layer has not been formed (i.e., covers at least some of the part whereon an active material layer has not been formed). The extent thereof can be set, for example, to a range of a width of 3 mm or less (e.g., 1 mm to 2 mm) toward the exterior from the above boundary. Such a mode enables prevention of the occurrence of micro-shorts to an even greater extent. Although not particularly limited herein, normally it is suitable to set the thickness of the porous inorganic layer provided on the part whereon an active material layer has not been formed to 0.5 μm or more (preferably 1 μm or more), but not greater than the thickness of the negative active material layer. Additionally, although not particularly limited herein, it is suitable to set the thickness of the porous inorganic layer at the width center of the negative active material layer to about 0.5 μm to 10 μm (e.g., 1 μm to 6 μm).

In the case of a negative electrode sheet of a mode in which the part whereon an active material layer has not been formed is provided only on one edge along the lengthwise direction, at the edge on the side opposite thereto, the edge face of the negative active material can be optionally covered or not covered by the porous inorganic layer. From the standpoint of productivity, etc., of the negative electrode sheet, as shown in the example illustrated in FIG. 3, a mode of negative electrode sheet 34 wherein the porous inorganic layer 346 is not provided on the edge face 344*c* on the opposite side from the part whereon an active material layer has not been formed 342*a* (in other words, the edge face along the thickness of the negative active material layer 344 is exposed) can be suitably used as the negative electrode sheet constituting the lithium-ion battery disclosed herein. For example, with a negative electrode sheet of this mode, the negative electrode sheet of the lithium-ion battery of the present invention can be produced more efficiently by forming the negative active material layer on a negative electrode collector having a width twice as wide as that of the target negative electrode sheet and leaving a band-shaped margin on both edges along the lengthwise direction of that collector, and then forming the porous inorganic layer on top of that active material layer and cutting it at the width center (slitting).

The above porous inorganic layer typically comprises particles of a nonconductive (insulating) inorganic compound (inorganic particles) as the main component thereof. An inorganic compound that can serve as a constitutive material of the inorganic particles can be an oxide, carbide, silicide, nitride, etc., of a metallic or nonmetallic element. From the standpoint of chemical stability, material cost, etc., oxide particles such as alumina ($Al_2O_3$), silica ($SiO_2$), zirconia ($ZrO_2$), magnesia (MgO) and the like can be preferably used. Additionally, silicide particles such as carbon silicide (SiC), etc., and nitride particles such as aluminum nitride (AlN), etc., can also be used.

For example, the same α-alumina particles as the inorganic oxide filler in the technology disclosed in Japanese Patent Application Laid-open No. 2005-327680 can be preferably used as the inorganic particles constituting the porous inorganic layer of the present invention. The above α-alumina particles can be particles wherein a plurality (e.g., about 2 to 10) of the primary particles are coupled just as in the technology disclosed in patent document 1. Such coupled particles can be manufactured based on the content disclosed in Japanese Patent Application Laid-open No. 2005-327680 and/or other publicly disclosed documents, and on common technical knowledge in the field, or a corresponding commercially available product can be obtained.

The average particle size of the inorganic particles can be about 0.1 μm to 15 μm, for example. For the average particle size herein, a volume-based average particle size ($D_{50}$) measured using a general, commercially available granulometer (a laser diffraction type particle size distribution measuring device, etc.) can be used. The use of inorganic particles with an average particle size of about 0.2 μm to 1.5 μm is preferred. The applied effects of the present invention can be displayed even better with a porous inorganic layer formed using ceramic particles having about this average particle size. A negative electrode with a configuration wherein such an inorganic layer is provided on top of the negative active material can be one suited for construction of a lithium-ion battery displaying even better battery performance.

In addition to the inorganic particles, the above porous inorganic layer can contain a binder (polymer component) for adhering the inorganic particles. As the binder, for example, one or more types of material suitably selected from the polymers noted above as a binder that can be admixed into the composition for forming the negative active material layer can be suitably used. Examples of binders other than the polymers specifically listed above that can be preferably used include rubbers containing acrylonitrile as a copolymer component thereof such as acrylonitrile-butadiene copolymer rubber (NBR), acrylonitrile-isoprene copolymer rubber (NIR), acrylonitrile-butadiene-isoprene copolymer rubber (NBIR), etc.; acrylic polymers containing acrylic acid, methacrylic acid, acrylic acid esters, or methacrylic acid esters (e.g., alkyl esters) as the main copolymer component thereof; vinyl acetate resins such as polyvinyl acetate, ethylene-vinyl acetate copolymer (EVA) etc.; and the like.

The binder used in forming the negative active material layer and the binder used in forming the porous inorganic layer can be the same or different. Preferably, the invention disclosed herein can be carried out in a mode wherein the binders used in both layers are different types of binders. For example, a water-based binder (CMC, etc.) and/or a water-dispersible binder (SBR, etc.) can be used for either the negative active material layer or the inorganic layer, and a binder that dissolves in an organic solvent (PVDF, organic solvent soluble acrylic polymer, etc.) can be used for the other layer.

The weight ratio of the inorganic particles and binder contained in the above inorganic layer (inorganic particles: binder) can be set in a range of about 80:20 to 99.5:0.5, for example. The above weight ratio can also be about 95:5 to 99:1.

A method wherein a coating material containing inorganic powder and binder is prepared, and the coating material is then applied on top of the negative active material layer can be preferably used as the method for forming the porous inorganic layer on the surface of the negative active material layer. Normally, a liquid coating material in a state that the above inorganic powder and binder is dispersed or dissolved in a suitable medium (typically a slurry, i.e., a slurry for forming the inorganic layer) is applied to the surface of the negative active material layer and dried. This method is preferred for its simplicity. Water (e.g., ion-exchanged water), organic solvent (e.g., N-methylpyrrolidone) or a mixed medium of water and organic solvent can be used as the above medium (dispersion medium for inorganic particles, etc.). Although not particularly limited herein, the NV of the liquid coating material (ratio of inorganic layer-forming component in the coating material) can be set, for example, at a range of about 30 to 80 wt %.

The above liquid coating material (typically, a slurry for forming the inorganic layer) can be prepared, for example, by mixing the inorganic particles and binder at the desired ratio. A general planetary mixer, roll mixer, mixer that uses a rotating stirring blade, etc., can be suitably used as the device to carry out the above mixing.

The medium used in the composition for forming the negative active material layer and the solvent used for the liquid coating material can be the same or different. For example, a medium different from the medium of the composition for forming the negative active material layer can be suitably used as the medium for the liquid coating material. If the medium of the composition for forming the negative active material layer is a water-based medium (e.g., water), a liquid coating material containing an organic medium such as N-methylpyrrolidone (NMP), etc., can be suitably used. By so doing, the phenomenon wherein the applied liquid coating material adversely affects the state of the negative active material layer (e.g., causing swelling) can be avoided even better by using a water based composition for forming the negative active material layer (typically, containing a water-soluble binder and/or water dispersible binder) and then forming the inorganic layer by applying a liquid coating of an organic-based medium (solvent-based, typically containing a binder that dissolves in an organic solvent). This effect can also be realized by the combination of an organic solvent-based composition for forming the negative active material layer and a water-based liquid coating material.

In one preferred embodiment of the technology disclosed herein, at least two different types of slurries are used as the above slurry for forming the inorganic layer. More specifically, as shown in FIG. 4 and FIG. 5, for example, at least two different types are used: a first slurry for forming the porous inorganic layer 346 that covers at least the edge of the negative active material layer 344 on the side of the part whereon the active material layer has not been formed 344b (inorganic layer first part 346a), and a second slurry for forming the porous inorganic layer 346 that covers at least the center width of the negative active material layer 344 (inorganic layer second part 346b). Thus, a porous inorganic layer 346 with different porosities (or different porosities and different basis weight) at the first part 346a and the second part 346b can easily be formed.

For example, by applying and drying the first slurry to the edge 344b of the negative active material layer (e.g., an area 2 mm wide toward the interior of the active material layer 344 from the boundary between the active material layer 344 and the part whereon the active material layer has not been formed 342a), the first part 346a is formed so that the edge 344b is completely covered thereby (i.e., so that slurry for forming the inorganic layer wraps around the edge 344b and extends to the surface of the collector 342). When the porous inorganic layer 346 is to be formed in an area extending toward the exterior even farther from the boundary between the negative active material layer 344 and the part whereon the active material layer has not been formed 342a as shown in FIG. 4 and FIG. 5, the above first slurry can be applied to that corresponding area (area extending toward the exterior from the above boundary). In addition, the second part 346b of the porous inorganic layer 346 is formed by applying and drying the second slurry to the part excluding the edge 344b within the negative active material layer 344 (but including the width center of the active material layer). It is preferable to form the porous inorganic layer 346 so that the first part 346a and the second part 346b are joined (i.e., so that there is no gap between the two parts).

The order of applying the first slurry and second slurry is not particularly limited herein. In other words, the first slurry can be applied first, the second slurry can be applied first, or both can be applied simultaneously. When one slurry is applied first, the other slurry can be applied after the previously applied slurry has been dried, or the other slurry can be applied before the previously applied slurry has been dried, and both slurries can be dried at the same time.

The first slurry and the second slurry can differ in one or more ways: for example, the type of inorganic particles constituting the slurry (material, particle shape, average particle size, particle size distribution, etc.), type of binder (polymer composition, molecular weight, etc.), weight ratio of inorganic particles to binder, type of medium, slurry NV, viscosity, thixotropy, method for preparing the slurry, and so on. For example, even if the various materials used to prepare the first and second slurries (starting materials) and the amounts of materials used are the same, a first and second slurry suitable for forming porous inorganic layers of different porosity can be prepared by varying the preparation method of the materials (device used for mixing, mixing time, mixing temperature, mixing pressure, order in which the materials are added, form in which the materials are added, and so on). Even if the starting materials are the same, the properties of the inorganic particles (particle shape, average particle size, particle size distribution, etc.) are changed due to the differences in the above preparation method, and it is thought that this is caused by differences in the dispersion state of the inorganic particles in the medium.

A method noted above wherein the types of slurries used in the first part and the second part are different can be preferably used as the method for forming porous inorganic layers with different degrees of porosity in the first part and the second part, but the present invention is not limited thereto. For example, a method using one type of slurry for forming the inorganic layer and changing the slurry application conditions (application rate, application amount, etc.) and drying conditions (drying temperature, drying rate, etc.), and a method wherein that slurry is applied and dried, and the first part is compressed to lower the porosity thereof, etc., can be used either alone or in suitable combinations thereof. These methods can be combined with the method wherein different types of slurries.

An example of another method for forming the porous inorganic layer on the negative active material layer using a coating material containing inorganic powder and binder involves forming the porous inorganic layer by applying a layer of a powdered coating material (coating material powder) comprising inorganic particles and thermoplastic resin particles (e.g., polyolefin particles, EVA particles, etc.) as the binder onto the negative active material layer, and then heating the same to fuse the inorganic particles together with the above thermoplastic resin.

First Embodiment

The lithium-ion battery disclosed herein provides an electrode assembly obtained by superposing and winding together the negative electrode sheet described above (which can be a negative electrode sheet manufactured by the method described above) and a positive electrode sheet having a positive active material layer on the surface of a long continuous sheet positive collector with a long continuous sheet separator interposed therebetween. Typically, the battery has a configuration wherein the electrode assembly is housed in a suitable outer case (container) together with a nonaqueous electrolyte.

Figure 2:
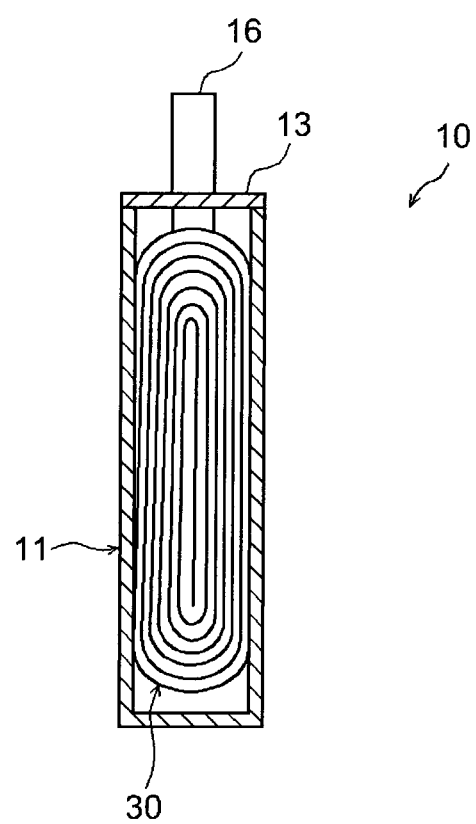
FIG. 2 is a profile drawing through section II-II of FIG. 1.

A first embodiment of this lithium-ion battery will be described below with reference to the drawings. As shown in FIG. 1 and FIG. 2, the lithium-ion battery 10 of this embodiment comprises a rectangular container 11 made of metal (plastic or laminated film containers are also acceptable). Within this container 11 is housed a wound electrode assembly 30 constructed by overlaying and then winding (in a flattened shape in this embodiment) a positive electrode sheet 32, a negative electrode sheet 34, and two sheets of separator 35.

The positive electrode sheet 32 comprises a long continuous sheet positive collector 322 and a positive active material layer 324 formed on the surface thereof. A sheet of material made of metal such as aluminum, nickel, titanium, etc., (typically, a metal foil, e.g., aluminum foil about 5 µm to 30 µm thick) can be used as the positive collector 322. The positive collector 324 has a positive active material capable of storing and releasing lithium ions as the main component thereof. An oxide type positive active material with a layered structure, an oxide type positive active material with a spinel structure, and the like generally used in lithium-ion batteries can preferably be used as this positive active material. For example, a positive active material having as the main component thereof a lithium cobalt complex oxide (typically $LiCoO_2$), lithium nickel complex oxide ($LiNiO_2$), lithium manganese complex oxide ($LiMn_2O_4$) etc. can be used.

In addition to the positive active material, the positive active material layer 324 can also contain a binder and a conductive material. The same binder that is used in the composition for forming the negative active material layer described above, etc., can be used as a binder therein. Various types of carbon black (acetylene black, furnace black, ketjen black, etc.), a carbon powder such as graphite powder, or a metal powder such as nickel powder, etc., can be used as the conductive material. Although not particularly limited herein, the amount of conductive material used in relation to 100 parts by weight positive active material can, for example, be set in the range of 1 to 20 parts by weight (preferably 5 to 15 parts by weight). Furthermore, the amount of binder used in relation to 100 parts by weight positive active material can, for example, be set in the range of 0.5 to 10 parts by weight.

To form the positive active material layer 324, typically the material for forming the positive active material layer (herein, a water-based paste mixture for the positive electrode), which has been prepared by mixing a suitable positive active material such as that described above with an appropriate conductive material, binder, and water (e.g., ion-exchanged water), is applied to the surface of both sides of the positive collector 322, and the applied material is then dried at a suitable temperature range so that the active material will not degenerate (typically 70 to 150° C.). Thereby, a positive active material layer 324 can be formed at the desired sites on the surfaces of both sides of the positive collector 322 (sites corresponding to the areas of application of the composition for forming the positive active material layer) (FIG. 3). The thickness and density of the positive active material layer 324 can be adjusted as desired by performing a suitable compression treatment (e.g., a roll press treatment) as needed.

As illustrated in FIG. 3, in this embodiment a part whereon the positive active material layer has not been formed 322a is provided at roughly the same position on both sides on one edge along the lengthwise direction of the positive collector 322. The width of this part whereon the active material layer has not been formed 322a can be set, for example, at about 10 mm to 30 mm, and in the present embodiment it is 17 mm. On the opposite side along the lengthwise direction of the positive collector 322, the positive active material layer 324 is formed all the way to the edge of the collector 322 on both sides.

The negative electrode sheet 34 comprises a long continuous sheet negative collector 342, a negative active material layer 344 formed on the surface thereof, and a porous inorganic layer 346 covering the negative active material layer as described above (FIGS. 3 to 5). Just as in the case of the positive electrode, the negative active material layer 344 is obtained by applying a suitable composition for forming the negative active material layer as described above to the surface of both sides of the negative collector 342 and drying the same at a suitable temperature, and as needed performing a suitable treatment to adjust the density thereof (e.g., a roll press treatment). A band-shaped portion whereon the negative active material layer has not been formed 342a is provided at roughly the same position on both sides of one edge along the lengthwise direction of the negative collector 342. The width of this part whereon the active material layer has not been formed 342a can be set, for example, at about 10 mm to 30 mm, and in this embodiment it is 15 mm. On the opposite side along the lengthwise direction of the negative collector 342, the active material layer 344 is formed all the way to the edge of the collector 342 on both sides.

The porous inorganic layer 346 is formed by applying a suitable coating material described above (typically, a liquid coating material) on top of the negative active material layer 344 and drying the same at a suitable temperature. In this embodiment, the inorganic layer 346 is formed in an area such that it starts from the flat part 344*a* of the negative active material layer 344, wraps around the edge 344*b* along the thickness thereof, and reaches the surface of the negative collector 342, and then extends about 2 mm onto the part whereon the active material layer has not been formed 342*a* of the collector 342. To facilitate understanding of the present invention, in FIG. 4 a part of the inorganic layer 346 has been removed at one edge in the lengthwise direction of the negative sheet 34 (lower left part of the drawing) so that the negative active material layer 344 underneath can be seen.

The inorganic layer 346 comprises a first part 346*a* provided to cover an area measuring 2 mm wide toward the interior of the active material layer 344 from the boundary of the negative active material layer 344 and the part whereon the active material layer has not been formed 342*a* (i.e., the edge 344*b*) and formed using a first slurry (e.g., slurry Y3 or Y4 described in the examples discussed below); and a second part 346*b* provided to cover the remaining part of the negative active material layer 344 and formed using a second slurry (e.g., slurry X1 described in the examples discussed below). As noted above, in this embodiment the first part 346*a* extends over the part whereon the active material layer has not been formed 342*a*. The inorganic layer 346 in this embodiment is formed so that the porosity Pa of the first part 346*a* is lower than the porosity Pb of the second part 346*b*, and basis weight 346*a*, 346*b* of both parts is roughly the same.

Various porous sheets known to be usable as separators in lithium-ion batteries comprising a non-aqueous electrolyte can be used as the separator 35 to be superposed and used with the positive electrode sheet and 32 and the negative electrode sheet 34. For example, a porous resin sheet (film) comprising a polyolefin resin such as polyethylene, polypropylene, etc., can be suitably used therefor. Although not particularly limited herein, for the properties of a preferred porous sheet (typically, a porous resin sheet) a porous resin sheet with an average pore size of about 0.0005 μm to 30 μm (more preferably 0.001 μm to 15 μm) and a thickness of about 5 μm to 100 μm (more preferably, 10 μm to 30 μm) can be listed. The porosity of the porous sheet can be, for example, about 20 to 90 vol % (preferably 30 to 80 vol %).

As illustrated in FIG. 3, when superposing the positive and negative electrode sheets 32, 34 and two separators 35, the positive and negative electrode sheets 32, 34 are superposed with a slight offset so that both active material layers 324, 344 are superposed, and the part of the positive electrode sheet whereon the active material layer has not been formed 322*a* and the part of the negative electrode sheet whereon the active material layer has not been formed 342*a* are positioned oppositely on one edge and the other edge along the lengthwise direction. In this embodiment, on the side of the part of the positive electrode sheet whereon the active material layer has not been formed 322*a*, the edge of the positive active material 324 and the edge face 344*c* of the negative active material 344 are roughly in the same position. On the other hand, on the side of the part of the negative electrode sheet whereon the active material layer has not been formed 342*a*, the edge of the negative active material layer 344 is positioned to stick out slightly beyond the edge of the positive active material layer 324 (in this embodiment, it sticks out the same amount as the edge of the positive electrode sheet 32). The width that the negative active material layer 344 sticks out beyond the positive active material layer 324 can be set, for example, to about 0.1 mm to 5 mm, and in the present embodiment it is approximately 1 mm.

The ends on one side of the two separators 35 along the longitudinal direction stick out, for example, at a width of about 2 mm beyond the edge of the negative active material layer 344 on the side of the part whereon the active material layer has not been formed 342*a*. The other edge along the lengthwise direction sticks out, for example, at a width of about 12 to 17 mm beyond the edge of the positive active material layer 324 on the side of the part whereon the active material layer has not been formed 322*a*. Making the width that the separators 35 stick out less than the width of the parts whereon an active material layer has not been formed 322*a*, 342*a* is preferred.

A flattened wound electrode assembly 30 can be obtained by winding the positive and negative electrode sheets 32, 34 and the two separator sheets 35 in this state and then pressing the wound assembly from the lateral direction to compress it.

Next, a positive terminal 14 and a negative terminal 16 for connection to the outside are each connected electrically to the resulting wound electrode assembly 30. This connection can be suitably carried out by taking the respective members sticking out beyond the separators 35 of the parts whereon a positive active material layer is not formed 322*a* and the parts whereon a negative active material layer is not formed 342*a* and grouping them in the radial direction of the wound electrode assembly 30, and then connecting (e.g., welding) those grouped parts to the positive terminal 14 and the negative terminal 16, respectively. In the present embodiment, because the electrolyte easily penetrates to the interior of the electrode assembly 30, the parts whereon the active material layers are not formed 322*a*, 342*a* are gathered in the radial direction at some of the some used for connection to the terminals 14, 16 within the circumferential direction of the wound electrode assembly 30. At the other sites, the parts whereon the active material layers are not formed 322*a*, 342*a* are open to the outside at both edges in the axial direction of the winding of the wound electrode assembly 30. FIG. 3 illustrates a cross-section of the parts open to the outside.

The electrode assembly 30 to which the terminals 14, 16 are connected is housed in a container 11, a suitable nonaqueous electrolyte is placed (injected) therein, and the container 11 is sealed. Thus, the construction (assembly) of the lithium-ion battery 10 of the present embodiment is completed. A nonaqueous electrolyte generally used in a lithium-ion battery can be used herein. For example, a nonaqueous electrolyte comprising a lithium salt such as $LiPF_6$, etc., (supporting electrolyte) at a concentration of about 0.1 mol/L to 5 mol/L (e.g., 0.8 mol/L to 1.5 mol/L) in a mixed medium suitably combined with carbonates such as ethylene carbonate (EC), propylene carbonate (PC), diethyl carbonate (DEC), dimethyl carbonate (DMC), ethyl methyl carbonate (EMC), etc., can be suitably used.

As shown in FIG. 3 and FIG. 5, in a lithium-ion battery 10 of this construction the edge 344*b* of the negative active material layer 344 is completely covered by the porous inorganic layer 346. Therefore, micro-shorts can be prevented to a great extent even when metallic contaminants have accumulated in the gap S shown in FIG. 3 because direct contact between the metallic precipitate from the contaminants and the negative electrode sheet 34 is inhibited by the porous inorganic layer 346. In addition, damage that occurs when the inorganic layer completely covers the above edge can be prevented or suppressed because the porous inorganic layer 346 is formed so that the ratio of the porosity Pa/Pb is less than 1.

Second Embodiment

A different embodiment of the lithium-ion battery disclosed herein will now be described. In this embodiment the inorganic layer 346 shown in FIG. 4 is formed so that the porosity Pa of the first part 346a is less than the porosity Pb of the second part 346b, and basis weight Wa of the first part 346a is less than basis weight Wb of the second part 346b. As a result, the thickness Ta of the first part 346a is less than the thickness Tb of the second part 346b. The structure of the other parts is the same as in the first embodiment.

In the lithium-ion battery 10 of this embodiment, the porous inorganic layer 346 is formed so that the porosity ratio Pa/Pb of the first part 346a to the second part 346b is less than 1, basis weight ratio Wa/Wb is less than 1, and the thickness ratio Ta/Tb is also less than 1. By adopting this configuration it is possible not only to prevent the occurrence of microshorts to a large extent, but also to prevent or suppress damage to an even greater extent when the inorganic layer is formed so that it completely covers the end of the active material.

Third Embodiment

Figure 6:
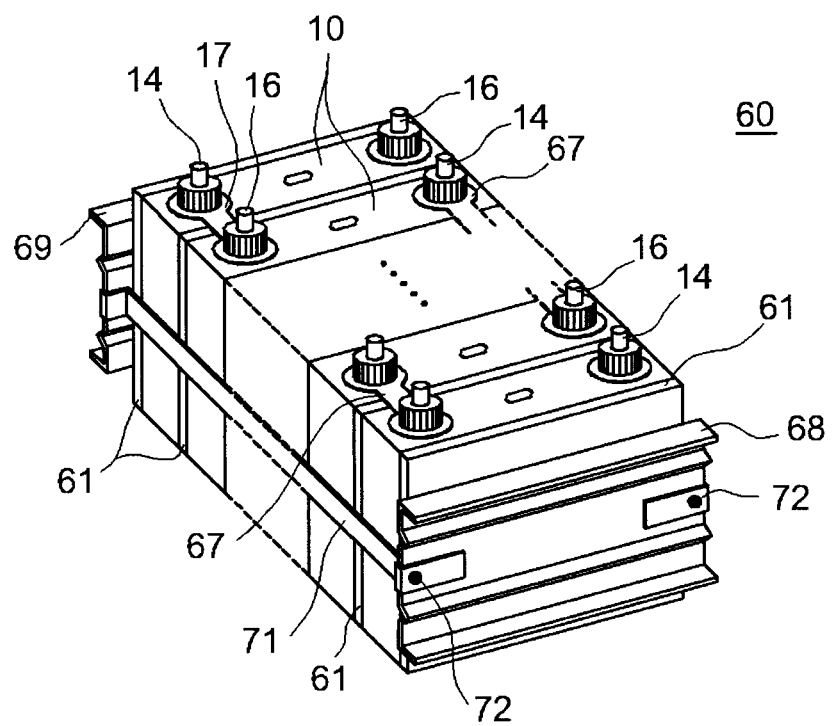
FIG. 6 is a perspective view illustrating the structure of one embodiment of the battery pack.

One embodiment of the battery pack disclosed herein will now be described. As shown in FIG. 6, the battery pack 60 of the present embodiment is constructed using a plurality (typically, 10 or more, preferably about 10 to 30, e.g., 20) of the lithium-ion batteries 10 of the first or second embodiment. These lithium-ion batteries (single cells) 10 are alternated one by one so that the respective positive terminals 14 and negative terminals 16 are inverted, and the wider sides of the container 11 (i.e., the sides corresponding to the flat sides of the wound electrode assemblies 30 contained in the container 11) are aligned opposite to each other. Between the aligned single cells 10 and outside both ends in the direction the single cells are aligned (stacking direction) cooling plates 61 of the desired shape are placed in tight contact with the wide surfaces of the container 11. These cooling plates 61 function as a heat dissipating material for more efficient release of the heat generated in each of the single cells during the time of use, and they have a shape enabling the entry of a coolant (typically, air) between the single cells 10 (e.g., a shape wherein a plurality of parallel grooves run vertically from one end of the rectangular cooling plate 61 and extend to the opposite end). Cooling plates 61 made of metal or a lightweight, rigid polypropylene or another synthetic resin with good thermal conductivity are preferred.

A pair of end plates 68, 69 are placed to the outside of the cooling plates 61 placed on both outside ends of the above aligned single cells 10 and cooling plates 61 (hereinafter, also referred to collectively as a "single cell cluster"). The complete assembly comprising the single cell cluster, in which the single cells 10 are aligned in the stacking direction, and the end plates 68, 69 (hereinafter also called "assembly to be restrained") is restrained at a specified restraining pressure P in the stacking direction of the assembly to be restrained (i.e., transverse direction in relation to the axis of the wound electrode assemblies 30) by restraining bands 71 for tightening that are attached so that they bridge both end plates 68, 69. More specifically, affixing the ends of the restraining bands 71 to the end plates 68 by machine screws 72 and tightening the same, the assembly is restrained so that the specified restraining pressure P is applied in the above stacking direction (e.g., the wider sides of the container 11 receive a surface pressure of about $2 \times 10^6$ to $5 \times 10^6$ Pa). Furthermore, between adjacent single cells 10 the positive terminal 14 of one and the negative terminal 16 of the other are connected electrically by connectors 67. A battery pack 60 with a desired voltage can be constructed by connecting each single cell 10 in series in this manner.

With a battery pack of this structure, both electrode sheets and the separators constituting the wound electrode assemblies of the single cells 10 constituting the battery pack are compressed in their stacking direction, and therefore the effect on battery performance of the material mobility capability at the edges of the active material layers is especially large. The battery pack 60 of this embodiment uses as single cells the lithium-ion batteries 10 of the first and second embodiments that apply the technology disclosed herein, and therefore both micro-short prevention and battery performance can be established at a high level in each single cell 10. Therefore, as a whole the battery pack 60 can display excellent micro-short prevention (e.g., high capacity retention rate) and battery performance (e.g., power output performance).

Test examples of the present invention are described below, but limiting the present invention to these specific examples is by no means intended thereby.

[Fabrication of the Slurry for Forming the Inorganic Layer]

A planetary mixer was charged with alumina particles having an average particle size of 0.7 μm (coupled particles were used), PVDF as binder, and NMP as a dispersing medium in a ratio such that the weight ratio was 95:5:250 (i.e., NV 40 wt %). The mixture was mixed for 20 min at 30 rpm to obtain slurry X1 for forming the porous inorganic layer. Then slurries Y1 to Y5 for forming a porous inorganic layer were fabricated in the same manner as slurry X1 above except that the mixing time in the planetary mixer was changed to 5 minutes, 10 minutes, 30 minutes, 60 minutes, or 90 minutes (in the order of shorter mixing times, the slurries were designated Y1, Y2, Y3, Y4, and Y5).

[Fabrication of Negative Electrode Sheet]

Natural graphite (negative active material) with an average particle size of 10 μm, SBR, and CMC were mixed together in ion-exchanged water so that the weight ratio of these materials was 98:1:1 to prepare a slurry of a composition for forming the negative active material layer. This composition was applied to both sides of a copper foil 10 μm thick, 160 mm wide, and 5000 mm long used as the negative collector, and dried to form the negative active material layer. In this case the range of application of the composition for forming the negative active material layer on both sides was set to a range so that a 15 mm band-shaped margin along the lengthwise direction of the copper foil would remain at the edge in both directions. Additionally, the applied amount of the composition for forming the negative active material layer, mathematically converted to NV, was set to be approximately 7 mg/cm$^2$ for both sides combined.

Using a general gravure coater, slurry X1 was applied on top of the negative active material layer formed above leaving a 2 mm wide band-shaped portion on both edges along the lengthwise direction of the active material layer. The application amount of slurry X1 was adjusted so that the target value of basis weight of the slurry was 2 to 3 mg/cm$^2$ (based on NV). The applied material was dried at 150° C. to fabricate the second part of the porous inorganic layer. Next each of the slurries shown in Table 1 was applied in the same manner using a gravure coater in a range so that it covered the part 2 mm wide on each edge of the negative active material that was left uncoated above, and so that it stuck out 2 mm from the formed width of the active material layer on both sides. At that time the applied amount was adjusted so that the target value of basis weight of each slurry would be about the same as the above second part. The first part of the porous inorganic layer was formed by drying the applied material at 150° C. The first part was formed so that it was continuous with both edges of the second part in the width direction.

Thereafter, two long continuous electrode sheets were fabricated by slitting the copper foil whereon the negative active material later and porous inorganic layer had been formed along the width center. As shown schematically in FIG. 4 and FIG. 5, each of these negative electrode sheets has a structure wherein a 15 mm wide band-shaped portion whereon the negative active material layer has not been formed 342a is provided on both surfaces over the entire length along one edge in the lengthwise direction of a 80 mm wide negative collector (copper foil) 342. On the other edge of the negative collector 342, a negative active material layer 344 is formed extending essentially to the end on both surfaces in the lengthwise direction. Furthermore, on the exterior surface of the active material layer 344, a porous inorganic layer 346 comprising a second part 346b covering the flat part 344a thereof and a first part 346a wrapping over the end 344b thereof and extending to the surface of the collector 342 is formed (in this embodiment, it also extends as far as a portion of the part whereon an active material layer has not been formed 342a).

[Fabrication of Lithium-Ion Battery]

Using the negative electrode sheet samples from examples 1 to 5 obtained above, lithium-ion batteries 10 having the configurations illustrated FIGS. 1 to 5 were fabricated in the order shown below.

The following was used as the positive electrode sheet. Lithium nickel oxide ($LiNiO_2$) powder, acetylene black, CMC, and PTFE were mixed together in ion-exchanged water so that the weight ratio of these materials would be 94:1:5, and so that the NV would be 45 wt % to prepare a slurry of the composition for forming a positive active material layer. This composition was applied to both surfaces of a long continuous aluminum foil 10 μm thick and 5000 mm long to be used for the positive collector, and then dried to form a positive active material layer. In this case the area of application of the composition for forming the positive active material layer comprised both sides while leaving a 17 mm wide band-shaped margin at each edge on both sides along the lengthwise direction of the aluminum foil. The amount of application of the composition for forming the positive active material layer in the above application area was adjusted so that the total amount of application to both sides (converted to NV) would be 10 mg/cm². The aluminum foil provided with a positive active material layer in this manner was fabricated into two long continuous positive electrode sheets by slitting along the width center thereof. This positive electrode sheet had a structure wherein a 17 mm wide band-shaped margin whereon the positive active material was not formed was provided on both sides along the lengthwise direction at one edge of the long continuous positive collector (aluminum foil) over the entire length thereof. At the other edge along the lengthwise direction of the positive collector, the positive active material layer was formed on both sides extending essentially all the way to the edge.

The negative electrode sheet samples fabricated as noted above and the positive electrode sheet were superposed, and two separators (in this case porous polypropylene sheets 30 μm thick and 5000 mm long were used) were interposed therebetween. At this time, both electrode sheets were superposed with an offset so that the part whereon the positive active material layer was not formed and the part whereon the negative active material layer was not formed were positioned on opposite sides, and the side of the negative electrode sheet with the part whereon the negative active material was not formed would stick out to a width of 1 mm beyond the positive electrode sheet (i.e., so that the entire part whereon the negative active material layer was not formed and a 1 mm area of the negative active material layer adjacent thereto would stick out beyond the edge of the positive active material layer) (see FIG. 3). This stacked sheet was wound approximately 30 cycles in the lengthwise direction, and the wound assembly was then compressed laterally to form an electrode assembly with a flattened shape.

Aluminum positive terminals were welded to the parts whereon the positive active material layer was not formed, and copper negative terminals were welded to the parts whereon the negative active material layer was not formed that were sticking out beyond the separators on both sides of the electrode assembly. After the electrode assembly was housed in a rectangular container and nonaqueous electrolyte was supplied to the interior through the liquid injection port of the container, the above liquid injection port was sealed. As the nonaqueous electrolyte, 50 mL per cell of nonaqueous electrolyte with a composition wherein a supporting electrolyte (in this case, $LiPF_6$) was dissolved in a mixed medium comprising EC, DMC, and EMC at a volume ratio of 1:1:1 to a concentration of 1 mol/L was used. After loading (injection) of the nonaqueous electrolyte, the batteries were let stand for 3 hours to allow permeation of the electrolyte. Next the batteries were charged at a constant current of 5 A (equivalent to 1 C) at an ambient temperature of 25° C. until the voltage between terminals rose from 0.0 V to 4.10 V, and then charging was continued at constant voltage until the total charging time reached 2 hours. After the constant current, constant voltage (CC-CV) charging, the batteries were stored 24 hours at 40° C. (initial charge treatment). The lithium-ion batteries of examples 1 to 5, which corresponded to each of the negative electrode sheet samples, were obtained in this manner.

[Porosity]

The porosity was determined in each of the negative electrode sheet samples both at the edge of the porous inorganic layer (in this case, the part 1 mm toward the interior from the boundary of the negative active material layer and the part whereon the negative active material was not formed) and at the width center (in this case, the exact center of the width of the negative active material layer).

More specifically, the film thickness profile of the negative electrode sheet before and after formation of the porous inorganic layer was measured using a rotary caliper thickness gauge (Maysun, Inc, model RC-1). The thickness of the porous inorganic layer covering the edge of the negative active material layer (first part) and the thickness of the porous inorganic layer covering the width center (second part) was determined thereby. In addition, a calibration curve of basis weight of α-alumina and the peak intensity from α-alumina on an x-ray fluorescence graph was prepared. basis weight values of the first and second parts of the porous inorganic layer were determined by applying this calibration curve to the x-ray fluorescence measurement results of each negative electrode sheet (x-ray fluorescence analysis). Then the porosity of both parts Pa, Pb was calculated by dividing the thickness of the porous inorganic layer by basis weight, and the porosity ratio Pa/Pb was determined.

In the present embodiment, the porosity of the porous inorganic layers formed from the slurries decreased as the mixing time during slurry preparation became longer. In other words, the porosity of the inorganic layers formed from each slurry decreased in the following order: slurry Y1 (mixing time 5 min)>Y2 (10 min)>X1 (20 min)>Y3 (30 min)>Y4 (60 min)>Y5 (90 min). Because the coupled particles (irregularly-shaped particles formed by coupling of a plurality of primary particles) were used as α-alumina particles, it is believed that this result was caused by the duration of mixing time and some of the above couplings were broken due to shearing forces that accompanied mixing. In other words, when some of the above couplings are broken, the size of the α-alumina particles decreases, and packing of the α-alumina particles increases because the shapes of the particles become more spherical. It is assumed that the decrease in porosity was caused by the increase in packing. In the negative electrode sheet samples of examples 1 to 5, the porosity of the second part Pb formed from slurry X1 ranged from 50.0 to 50.5 vol %, and it was verified that this porosity had good reproducibility.

[Measurement of Film Resistance at the Edge]

Copper foil 10 mm wide, 70 mm long, and 15 μm thick was pressed onto the first part of each negative electrode sheet sample (i.e., the porous inorganic layer formed at the edge of the negative active material) with a force of 150 N. In this state the resistance between the collector constituting the negative electrode sheet and the above copper foil was measured by a conventional four-terminal resistance measurement method. This value was converted to a value for resistance per contact area between the above first part and the copper foil, and then the film resistance [$\Omega/cm^2$] at the edge part of the porous inorganic layer of each example was determined therefrom.

[Internal Resistance Value]

The lithium-ion batteries of each example were charged with a constant current of 1 C (in this case, 5 A) at an ambient temperature of 25° C. until the voltage between terminals rose from 3.0 V to 3.72 V, and then charging was performed at a constant voltage until the total time for constant current-constant voltage charging reached 2 hours. After the constant current-constant voltage (CC-CV) charging, the batteries were discharged at 25° C. for 10 seconds at a constant current of 60 A (equivalent to 12 C). Based on the amount of voltage change at this time, the IV resistance value (mΩ) at 25° C. was calculated.

Figure 7:
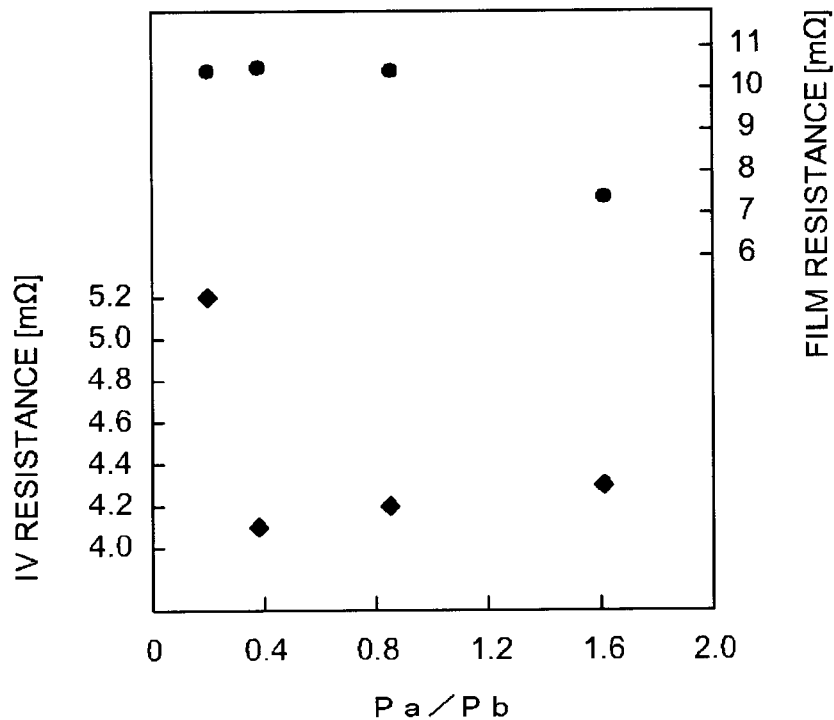
FIG. 7 is a graph showing the relationship between the porosity ratio Pa/Pb of the porous inorganic layer and both internal resistance of the battery (IV resistance) and film resistance of the porous inorganic layer covering the edge of the negative active material layer.

For the negative electrode sheet samples and batteries of examples 1 to 4, Table 1 shows the type of slurry used to form the first part and second part of the porous inorganic layer, porosity ratios of both parts, film resistance of the first part, and IV resistance value of the battery. FIG. 7 shows the relationship between porosity ratio, IV resistance, and film resistance.

TABLE 1

| | 1st slurry | 2nd slurry | Porosity ratio Pa/Pb | Battery IV resistance (mΩ) | Film resistance ($\Omega/cm^2$) |
|---|---|---|---|---|---|
| Ex. 1 | Y5 | X1 | 0.20 | 5.2 | 10.4 |
| Ex. 2 | Y4 | X1 | 0.38 | 4.1 | 10.5 |
| Ex. 3 | Y3 | X1 | 0.85 | 4.2 | 10.4 |
| Ex. 4 | Y1 | X1 | 1.61 | 4.3 | 7.4 |

As one can see from the table and figure, in examples 2 and 3 wherein the porosity ratio is 0.25 or more, but less than 1, the internal resistance of the battery can be held to a value less than or equal to a structure with a lower film resistance (example 4) while maintaining a structure wherein the edge part of the negative active material is completely covered by a porous inorganic layer with a sufficiently high film resistance (specifically, 10 $\Omega/cm^2$). In other words, a battery could be realized with a structure that prevents micro-shorts at the edge even better while still holding down an increase in internal resistance.

Figure 8:
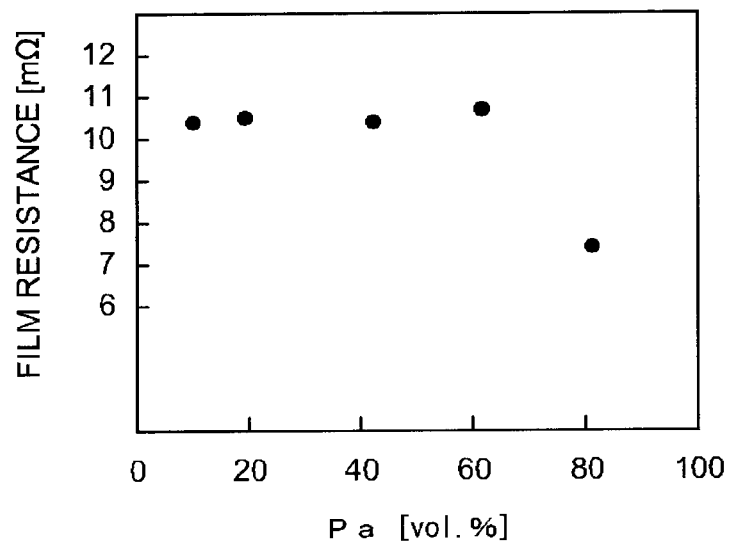
FIG. 8 is a graph showing the relationship between the porosity Pa of the porous inorganic layer covering the edge of the negative active material layer and the film resistance of the porous inorganic layer covering the edge of the negative active material layer.

For the negative electrode sheet samples of examples 1 to 5, Table 2 shows the type of slurry used to form the first part of the porous inorganic layer, porosity Pa of the first part, and film resistance value. Additionally, FIG. 8 shows the relationship between the porosity Pa of the first part and film resistance.

TABLE 2

| | 1st slurry | Porosity Pa (vol %) | Film Resistance ($\Omega/cm^2$) |
|---|---|---|---|
| Ex. 1 | Y5 | 10.4 | 10.4 |
| Ex. 2 | Y4 | 19.3 | 10.5 |
| Ex. 3 | Y3 | 42.3 | 10.4 |
| Ex. 5 | Y2 | 61.6 | 10.7 |
| Ex. 4 | Y1 | 81.0 | 7.4 |

As one can see from the figure and table, the first part of the porous insulating film in examples 1 to 3 and 5 wherein the porosity Pa was held down to a range of 70 vol % or less (more specifically 10 to 65 vol %) exhibited a sufficiently high film resistance (specifically, 10 $\Omega/cm^2$) in all cases. Therefore, one can see that with the negative electrode sheets of these examples a lithium-ion battery can be constructed that exhibits clearly superior micro-short protection to example 4, for example, wherein the porosity Pa of the first part exceeds 80 vol %.

Reference Examples

To verify the effect of making basis weight of the first part of the porous inorganic layer less than basis weight of the second part, the following experiment was carried out. In these reference examples the entirety of the porous inorganic layer (i.e., both the first part and the second part) was formed using the above slurry X1. The application amount of slurry X1 was adjusted so that the target value of basis weight on the flat part of the negative active material later would be 0.65 to 0.75 mg/cm². This adjustment was carried out so that the distance from one edge of the formed width of the negative active material layer would lie at ¼, 2/4, and ¾ before slitting. The porous inorganic layer was formed on both edges along the lengthwise direction of the negative active material layer before slitting, either by adjusting the gravure coater so that the target value of basis weight of the slurry would be greater than that of the above flat part or by applying the slurry at a basis weight equivalent to that of the above flat part, then the basis weight was reduced by filing down the above inorganic layer with emery paper in an area up to 2 mm toward the width center from both edges along the lengthwise direction of the negative active material layer. With respect to all other points, just as in the case of examples 1 to 5, nine types of negative electrode sheet samples were fabricated having different weight ratios Wa/Wb of basis weight Wa of the first part (in this case measured at a part 1 mm toward the interior from the boundary between the negative active material layer and the part whereon the active material layer was not formed) and basis weight Wb of the second part (in this case, the exact center of the width of the negative active material layer). In all, nine types of lithium-ion batteries corresponding to each of the negative electrode sheet samples were obtained in the same manner as above except that these electrode sheet samples were used instead.

[Evaluation of Capacity Retention]

The nine types of lithium-ion batteries fabricated above were discharged at 25° C. at a constant current of 5 A from 4.1 V to 3.0 V, and then discharged at a constant voltage until the total discharge time reached 2 hours. The discharge capacity for this CC-CV discharge (initial capacity) was measured thereby. Next, for each battery charging at a constant current of 5 A from 3.0 V to 4.1 V and discharging at a constant current of 5 A from 4.1 V to 3.0 V were repeated alternately for 1000 cycles. After this charge-discharge cycling, the batteries were discharged at a constant current of 5 A from 4.1 V to 3.0 V, discharged at a constant voltage until the total discharge time reached 2 hours, and then the discharge capacity (capacity after cycling) at that time was measured. The rate of capacity loss (%) due to the above charge-discharge cycling was determined by this formula: [1−{(capacity after cycling)/(initial capacity)}]×100. results are shown in Table 3.

TABLE 3

| Wa (mg/cm$^2$) | Wb (mg/cm$^2$) | Wa/Wb | Loss of capacity (%) |
|---|---|---|---|
| 1.05 | 0.65 | 1.62 | 12.8 |
| 0.96 | 0.74 | 1.30 | 13.5 |
| 0.74 | 0.62 | 1.19 | 7.6 |
| 0.71 | 0.65 | 1.09 | 7.9 |
| 0.76 | 0.75 | 1.01 | 7.6 |
| 0.58 | 0.72 | 0.81 | 7.9 |
| 0.41 | 0.71 | 0.58 | 8.2 |
| 0.34 | 0.69 | 0.49 | 12.3 |
| 0.32 | 0.72 | 0.44 | 12.1 |

As one can clearly see from the table, lithium-ion batteries constructed using the electrode sheet samples wherein the range of Wa/Wb was about 0.5 to 1.2 demonstrated high capacity retention with a capacity loss of roughly 8%. It was confirmed that a higher capacity retention can be obtained with these batteries than in batteries wherein Wa/Wb is either less than 0.5 or greater than 1.2. From the above test results and the effect discussed above resulting from making Wa/Wb less than one, (e.g., the fact that the wound electrode assembly can be wound even tighter and the fact that the mobility of the electrolyte and other materials can be increased), it can be seen that if Wa/Wb is set to a range of 0.5 or more, but less than 1, a battery can be realized that not only has excellent micro-short prevention, but also higher performance (e.g., improvement in at least one other property such as capacity retention, energy density, power output, etc.)

Specific examples of the present invention were described above in detail, but these are merely examples and do not limit the scope of the claims in any way. The technology disclosed in the claims encompasses a variety of modifications and alterations of the specific examples described above.

Figure 9:
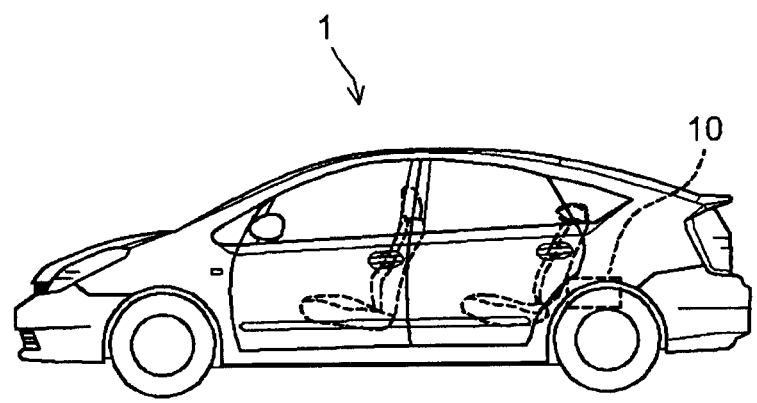
FIG. 9 is a side view schematically illustrating a vehicle equipped with the lithium-ion battery of the present invention.

As noted above, the lithium-ion battery of the present invention is one with excellent battery performance and high reliability because it can prevent micro-shorts to a large extent. For example, this enables micro-short prevention to be increased while suppressing internal resistance even at a high rate discharge of 5 C or more, or even 10 C or more. Through utilizing these strengths, the lithium-ion battery of the present invention can be used most suitably as a constituent element of a power source for a motor mounted in a vehicle such as an automobile. Therefore, as schematically illustrated in FIG. 9, the present invention provides a vehicle 1 (typically, an automobile, and especially an automobile equipped with a motor such as a hybrid automobile, electric automobile, fuel cell automobile and the like) equipped with any of the lithium-ion batteries 10 (which can be in the mode of a battery pack formed by connecting a plurality of the lithium-ion batteries 10 in series) disclosed herein.

The invention claimed is:

1. A lithium-ion battery comprising an electrode assembly obtained by superposing and winding together a negative electrode sheet having a negative active material layer on the surface of a long continuous sheet negative electrode collector, a positive electrode sheet having a positive active material layer on the surface of a long continuous sheet positive electrode collector, and a long continuous sheet separator interposed therebetween, wherein
   the negative active material layer is formed, with a band-shaped portion being left on at least one edge of the negative electrode collector along the lengthwise direction thereof;
   the negative electrode sheet is superposed on the positive electrode sheet so that the band-shaped portion sticks out beyond one edge of the positive electrode sheet along the lengthwise direction thereof;
   on the exterior surface of the negative active material layer, a porous inorganic layer is formed starting at the flat part of the active material layer, wrapping around the end thereof on the side of the band-shaped portion, and extending to the surface of the negative electrode collector; and
   porosity Pa [vol %] of the porous inorganic layer at the edge of the negative active material layer on the side of the band-shaped portion is lower than porosity Pb [vol %] of the inorganic layer at the width center of the active material layer.

2. The battery according to claim 1, wherein a ratio Pa/Pb of the porosity Pa to the porosity Pb is 0.25 or more, but 0.95 or less.

3. The battery according to claim 1, wherein the porosity Pa is 20 to 65 vol %.

4. The battery according to claim 1, wherein basis weight Wa [mg/cm$^2$] of the inorganic layer at the edge of the negative active material layer on the side of the band-shaped portion is less than basis weight Wb [mg/cm$^2$] of the inorganic layer at the width center of the negative active material layer.

5. A battery pack comprising a plurality of single cells aligned in a predetermined direction, wherein
   each of the single cells has a structure in which an electrode assembly obtained by superimposing and winding together positive and negative electrode sheets with a separator interposed therebetween is housed in a container;
   the plurality of single cells is aligned in the transverse direction in relation to the axis of the electrode assembly and restrained in a state such that a load is applied in the direction of alignment; and
   at least one of the single cells is the battery according to claim 1.

6. A method for producing a lithium-ion battery having an electrode assembly obtained by winding positive and negative electrode sheets, each having a layer of active material formed on the surface of a long continuous sheet collector, together with a long continuous sheet separator,
   the method comprising:
   a step of forming a negative active material layer on the surface of the negative electrode collector, with a band-shaped portion being left on at least one edge of the negative electrode collector along the lengthwise direction thereof;
   a step of applying a slurry for forming an inorganic layer containing inorganic particles and binder to the negative electrode collector on which the negative active material layer has been formed and forming a porous inorganic layer starting at the flat part of the negative active material layer, passing over the end thereof on the side of the band-shaped portion, and extending to the surface of the negative electrode collector, such that within the porous inorganic layer, porosity Pa [vol%] of the inorganic layer at the edge of the negative active material layer on the side of the band-shaped portion is lower than porosity Pb [vol%] of the inorganic layer at the width center of the active material layer;

a step of superposing the negative electrode sheet, which has been prepared by forming the negative active material layer and the porous inorganic layer on the surface of the negative electrode collector, and the positive electrode sheet so that the band- shaped portion sticks out beyond one edge of the positive electrode sheet along the lengthwise direction, with a separator interposed therebetween, and winding together the superposed positive electrode sheet, negative electrode sheet, and separator to construct an electrode assembly; and a step of housing the electrode assembly in a container together with a nonaqueous electrolyte to configure a lithium-ion battery.

7. The method according to claim 6, wherein at least two types of slurries, which are a first slurry and a second slurry, are used as the slurry for forming the inorganic layer, with the first slurry being applied at the edge of the negative active material layer on the side of the band-shaped portion, and the second slurry being applied at the width center of the active material layer.

8. A vehicle comprising the lithium-ion battery according to claim 1.

9. The battery according to claim 1, wherein the thickness of the porous inorganic layer at the edge of the negative active material layer on the side of the band-shaped portion is less than the thickness of the porous inorganic layer at the width center of the negative active material layer.

\* \* \* \* \*